US009151519B2

(12) United States Patent
Esken

(10) Patent No.: US 9,151,519 B2
(45) Date of Patent: Oct. 6, 2015

(54) MOUNTING SYSTEM FOR INSTALLING SOLAR SYSTEM MODULES ON ROOFS

(75) Inventor: Manfred Esken, Soest (DE)

(73) Assignee: Kieselbach Solar GmbH, Soest (DE)

( * ) Notice: Subject to any disclaimer, the term of this patent is extended or adjusted under 35 U.S.C. 154(b) by 170 days.

(21) Appl. No.: 13/824,433

(22) PCT Filed: Sep. 12, 2011

(86) PCT No.: PCT/EP2011/065776
§ 371 (c)(1),
(2), (4) Date: Mar. 18, 2013

(87) PCT Pub. No.: WO2012/038294
PCT Pub. Date: Mar. 29, 2012

(65) Prior Publication Data
US 2013/0206941 A1    Aug. 15, 2013

(30) Foreign Application Priority Data

Sep. 22, 2010    (EP) .................................... 10010122

(51) Int. Cl.
*E04G 3/20*    (2006.01)
*F24J 2/52*    (2006.01)
(Continued)

(52) U.S. Cl.
CPC .............. *F24J 2/5245* (2013.01); *F16M 13/02* (2013.01); *F24J 2/5247* (2013.01); *F24J 2/5264* (2013.01); *F24J 2002/4656* (2013.01);
(Continued)

(58) Field of Classification Search
CPC .......... E04G 3/26; Y02B 10/20; Y02B 10/12; Y02B 10/10; Y02B 10/50; H01L 31/042; H01L 31/0422; H01L 31/0424; H01L 31/05

USPC .......... 248/237, 295.11, 220.22, 148, 229.12, 248/536; 52/27, 90.1, 173.3; 136/244; 126/623; 182/117, 45 R
See application file for complete search history.

(56) References Cited

U.S. PATENT DOCUMENTS

| 3,448,650 | A | * | 6/1969 | Whitehouse | .................. 411/529 |
| 4,181,293 | A | * | 1/1980 | Laribee | .......................... 256/67 |
| 5,619,834 | A | * | 4/1997 | Chen | ............................... 52/509 |

(Continued)

FOREIGN PATENT DOCUMENTS

| DE | 201 19 478 U1 | 4/2002 | ................. F24J 2/52 |
| DE | 10246935 A1 | 7/2004 | ................. F24J 2/52 |

(Continued)

OTHER PUBLICATIONS

Int'l Search Report from corresponding PCT/EP2011/065776 (Form PCT/ISA/210); 4 pages.

(Continued)

*Primary Examiner* — Christopher Garft
(74) *Attorney, Agent, or Firm* — Kusner & Jaffe

(57) ABSTRACT

A roof hook for mounting of solar installation modules on roofs. The roof hook has a first fastening section, which extends in the X and Y direction for fixing a roof hook, a hook-shaped mount for fixing the solar installation module or a fastening profile for solar installation modules and a second fastening section which runs perpendicular to the first fastening section in the Z direction from the latter. The mount is adjustable on the second fastening section in the Z direction, and fasteners act obliquely to the Z direction for fixing the mount on the fastening section.

9 Claims, 2 Drawing Sheets

(51) Int. Cl.
*F16M 13/02* (2006.01)
*F24J 2/46* (2006.01)

(52) U.S. Cl.
CPC ......... *F24J 2002/4661* (2013.01); *Y02B 10/20* (2013.01); *Y02E 10/47* (2013.01)

(56) References Cited

U.S. PATENT DOCUMENTS

| | | | |
|---|---|---|---|
| 6,698,971 B1* | 3/2004 | Wilhelmi | 403/403 |
| 8,316,592 B2* | 11/2012 | Lanza | 52/173.3 |
| 8,844,887 B2* | 9/2014 | Genschorek | 248/220.22 |
| 2011/0248131 A1* | 10/2011 | Genschorek | 248/220.22 |

FOREIGN PATENT DOCUMENTS

| | | | | |
|---|---|---|---|---|
| DE | 20 2005 019 897 U1 | 4/2006 | ............. | E04D 13/18 |
| DE | 20 2008 016 000 U1 | 4/2009 | ............. | E04D 13/00 |
| DE | 20 2009 002 134 U1 | 6/2009 | ............. | E04D 13/18 |
| DE | 20 2010 001 175 U1 | 4/2010 | ............. | E04D 13/18 |
| EP | 0 881 339 A1 | 10/2011 | ............. | E04D 13/12 |
| JP | 60261860 | 12/1985 | ............. | E04D 13/00 |
| JP | 0932220 | 2/1997 | ............. | E04D 13/072 |
| JP | 10223203 | 8/1998 | ............. | H01M 2/30 |
| JP | 2006-200314 | 8/2006 | ............. | E04D 13/072 |
| JP | 2006-210613 | 8/2006 | ............. | E04D 13/00 |
| JP | 2010-090862 | 4/2010 | ............. | F01N 13/08 |
| WO | WO 2010/060391 | * | 6/2010 | |

OTHER PUBLICATIONS

Notice for Reasons for Rejection received in connection with Japanese Patent Application No. 2013-529610 (English-language translation included) dated Jun. 8, 2015

* cited by examiner

MOUNTING SYSTEM FOR INSTALLING SOLAR SYSTEM MODULES ON ROOFS

FIELD OF THE INVENTION

The invention relates to a roof hook for mounting of solar installation modules on roofs.

BACKGROUND OF THE INVENTION

Known roof hooks in their fastening section have several bores for accommodating fastening screws. DE 20 2008 016 000 U1 shows a roof hook which is made divided and EP 0881339 A1 discloses a safety roof hook. By means of the fastening screws the roof hook is fastened on the roof, especially to roof panels which lie under the pantiles. The hook-shaped holder section protrudes under the pantiles on the roof top. The solar installation modules are fastened directly or indirectly via fastening profiles to the holding section, generally with fastening screws. The known roof hooks are usually made integral and are generally welded together from two segments, specifically the fastening section and the holding section. The disadvantage in the known roof hooks is the involved mounting due to poorly reachable fastening elements and lacking or insufficient adjustment possibilities to the roof hooks on different pantiles and/or different solar installation modules or fastening profiles for solar installation modules.

SUMMARY OF THE INVENTION

An advantage of the present invention is an improved roof hook which has easily reachable fastening elements and which enables faster and easier mounting.

In accordance with the present invention, there is provided a roof hook for mounting solar installation modules on roofs. The roof hook is comprised of a first fastening section, which extends in the X and Y direction for fixing a roof hook, a hook-shaped mount for fixing the solar installation module or a fastening profile for solar installation modules and a second fastening section which runs perpendicular to the first fastening section in the Z direction from the latter. The mount is adjustable on the second fastening section in the Z direction, and fasteners act obliquely to the Z direction for fixing the mount on the fastening section.

Advantageous configurations of the invention are given in the dependent claims.

A roof hook according to the present invention can be produced modularly from at least two components. The fastening surfaces which are made integral on the respective component are connected by force-fit, especially positively by a connecting element to the mount. In contrast to known adjustable roof hooks, the roof hook as claimed in the invention can be set/adjusted via an individual, i.e., single, easily reachable connecting element and can be adapted appropriately to the pantiles, which greatly facilities the mounting of solar installation modules high up on roofs. In this way, it becomes possible as claimed in the invention to implement the most varied types of roof mounting systems with a uniform first component.

One important advantage is achieved in that the roof hook as claimed in the invention can be adjusted essentially perpendicular to the roof surface or to the first fastening section so that a location bordering the roof hook on the pantiles is not influenced, as would be the case for diagonal adjustability.

Another important advantage of the invention is that the fastening element which is provided for adjusting the mount in the vertical direction to the roof surface is not located parallel to the roof surface, i.e., orthogonally to the adjustment direction, but is tilted obliquely in the direction of the mount. In this way, the fastening element can be easily reached, which greatly facilitates mounting.

The roof hook as claimed in the invention shows a first fastening section which extends in the X and Y direction with bores for connecting elements, such as screws, for fixing the roof hook on the roof. Moreover the roof hook has a second fastening section which runs essentially perpendicular to the first fastening section in the Z direction from the latter and to which a hook-shaped mount is fastened for fixing a solar installation module or a fastening profile for solar installation modules. The mount is adjustable on the second fastening section in the Z direction, and there being fasteners which act obliquely to the Z direction for fixing the mount on the fastening section.

In an embodiment of the invention it is advantageously provided that the mount for the solar installation modules has a transition leg which is located roughly parallel to the second fastening section. The transition leg is connected to a U-shaped hook section. This hook section is comprised of a support leg which runs parallel to the plane of the first fastening section and which is connected to a bottom leg which extends roughly in the Z-direction. The bottom leg runs roughly parallel to the transition leg. The bottom leg in turn ends in a fixing leg which runs parallel to the plane of the first fastening section.

The pantiles are accommodated in the U-shaped hook section and are secured on the fixing leg. The fixing leg in turn ends in a mounting leg which extends essentially in the Z direction and which is intended for the fixing of a solar module or of a fastening profile for solar installation modules.

Advantageously there is the mounting leg with a slot which is used for adjustment. A fastening screw for fixing the solar installation module or the fastening profile can be accommodated and adjusted in the slot. By configuring the hole as a slot, tolerances can be easily equalized. Instead of the mounting hole being made as a slot, a plurality of aligned round holes can be provided.

In another advantageous configuration of the invention the mounting leg on one fastening surface facing the solar module or its fastening profile has engagement elements, such as ribs, which extend at least partially in the X direction, preferably continuously from one end of the fastening surface to the opposing end. The ribs can be caused to engage corresponding engagement elements on the solar installation modules or fastening profiles for solar installation modules in order to ensure nonpositive fixing.

According to one embodiment of the invention, the second fastening section on one fastening surface facing the mount, and the transition leg which runs essentially parallel to the fastening surface on a fastening surface which faces the second fastening section both have engagement elements, especially ribs, which extend at least partially in the X direction, especially continuously from one end of the fastening surfaces to the opposite end. In this way, force-fit fixing of the mount on the second fastening section via frictional locking and interference fit by the fasteners is possible.

According to one feasible development of the invention, the second fastening section has a slot which extends in the X direction and which is penetrated by a connecting element, especially a screw, of the fasteners so that the mount can be horizontally adjusted.

The vertical adjustability of the mount, therefore parallel to the second fastening section in the Z direction, is enabled by a slot in the stop surface of the transition leg. The stop surface of the mount opposite the fastening surface of the transition leg and the stop surface of the second fastening section opposite the fastening surface are arranged obliquely to the Z direction, essentially orthogonally to the direction of action of the fasteners. In this way, the fasteners or the connecting element for fixing the mount on the second fastening section does not extend parallel to the first fastening section, i.e., in the Y direction, but are tilted by an angle α to the Z direction.

The center longitudinal axis of the connecting element of the fasteners which act obliquely to the Y and Z direction extends at an angle $0<\alpha<60°$, preferably $10<\alpha<40°$, more preferably $15<\alpha<25°$, to the first fastening surface in the space which is opened up by the first fastening surface and the second fastening surface. The connecting element is thus more easily accessible, which greatly facilities the mounting of the roof hook.

The roof hook as claimed in the invention can therefore be adjusted in the Z direction on the one hand in order to equalize the tolerances which occur in pantiles or to be able to use different pantile types. On the other hand, a roof hook according to the present invention does not have fasteners which are provided perpendicular thereto, in the Y direction. A fastening element, according to the present invention, is tilted in the direction of the mount and therefore is much more easily accessible.

The roof hook is advantageously produced by way of a die casting method which, compared to the otherwise conventional extrusion method among others, enables a much higher stability and less risk of injury as a result of the heat treatment.

By making the mount in one piece from an aluminum casting, it is possible to make the transitions bent between the transition leg and the support leg, the support leg and the bottom leg, and the bottom leg and the fixing leg, as well as the fixing leg and the mounting leg.

One preferable load-carrying roof hook is obtained by there being at least one reinforcing rib. In particular, the reinforcing ribs are located in the region of the transition leg and extend in the Y direction out of the plane of the second fastening section, especially in the edge region of the stop surface of the transition leg.

In one configuration of the invention, at least one reinforcing rib, preferably two reinforcing ribs, extend at least over one part of the edge region of the stop surface of the transition leg. In this way the transition between the second fastening section, the transition leg and the support leg is reinforced. As a result of the stable configuration of the roof hook the roof tiles are unloaded and their breakage is avoided. Significant sagging in the Z direction is thus essentially precluded under the bearing loads which arise.

The transition region from the second fastening section to the mount can be further stabilized in that the height and/or the width of the reinforcing ribs which extend along the edge region of the stop surface of the transition leg, increase in the direction of the first fastening section, i.e., in the Z direction.

To further increase the stability of the roof hook, there can be one, preferably two, obliquely running (extending) reinforcing ribs on the first fastening section which extends along the XY plane and in the Z direction increases over its course in the direction of the transition leg.

BRIEF DESCRIPTION OF THE DRAWINGS

The invention is detailed below using one exemplary embodiment shown in the drawings.

DETAILED DESCRIPTION OF PREFERRED EMBODIMENTS

Figure 1:
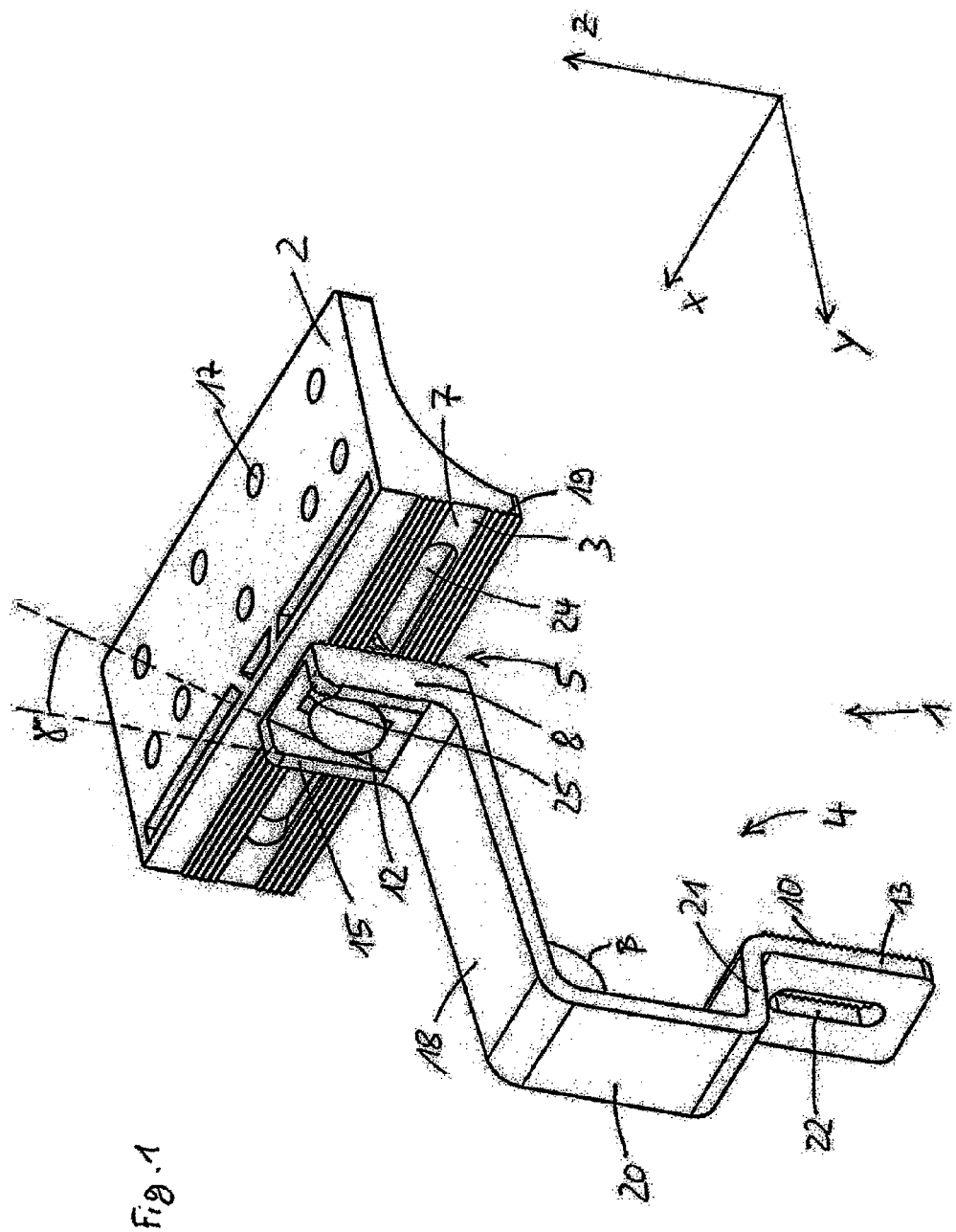
FIG. 1 shows a perspective view of a roof hook as claimed in the invention.

In the figures the same components and components with the same action are identified with the same reference numbers.

The figures show a roof hook or mounting system 1. To simplify the description of the location of the individual components of the roof hook 1 to one another, a Cartesian coordinate system with three axes X, Y and Z which run orthogonally to one another is introduced.

The roof hook 1 as claimed in the invention has a base unit having a first fastening section 2 which is rectangular in a plan view with a fastening surface which extends in the X and Y direction. The first fastening section 2 is provided with two parallel rows of mounting holes 17 which run in the X direction. These holes are used to accommodate fastening screws (not shown) for fixing the roof hook 1 with its first fastening section 2 on the roof.

In addition to the first fastening section 2, the base unit of the roof hook 1 has a second fastening section 3 which is rectangular in a plan view. The second fastening section 3 extends essentially perpendicular to the first fastening section 2 in the Z direction. The second fastening section 3 has a fastening surface 7 on which a mount 4 with a corresponding fastening surface 9 can be fixed. The second fastening section 3 has a slot 24 which extends in the X direction and which can be penetrated by a connecting element 6 so that the mount 4 can be horizontally adjusted.

The fastening surface 7 in the exemplary embodiment has engagement elements which are made as ribs 19 and which extend in the X direction continuously from one end of the fastening surface 7 to the opposite end. Ribs 19 can be caused to engage corresponding ribs 10 of the fastening surface 9 of one transition leg 8 of the mount 4.

The mount 4 is comprised of transition leg 8, a support leg 18, a bottom leg 20, a fixing leg 21 and a mounting leg 13. The transition leg 8 ends in the support leg 18 which runs in the Y direction. The support leg 18 in turn ends in the bottom leg 20 which runs in the Z direction and which in turn ends in the fixing leg 21 which is located for the most part parallel to the support leg 18 and which runs essentially in the Y direction opposite to the support leg 18. The fixing leg 21 extends as far as the mounting leg 13, which runs in the Z direction. Mounting leg 13 advantageously has a slot 22 which extends likewise in the Z direction and is intended for fixing a solar installation module or a fastening profile for solar installation modules.

In the exemplary embodiment, the mounting leg 13 has a fastening surface 14, which faces the solar installation module or the fastening profile for solar installation modules. Fastening surface 14 has ribs 10 which extend continuously from one end of the fastening surface 14 to the opposite end in the X direction and are designed for nonpositive engagement to a corresponding section of a solar installation module (not shown) or of a fastening profile for solar installation modules.

An angle β between the bottom leg 20 and the support leg 18 in the illustrated exemplary embodiment is roughly 95°.

Figure 2:
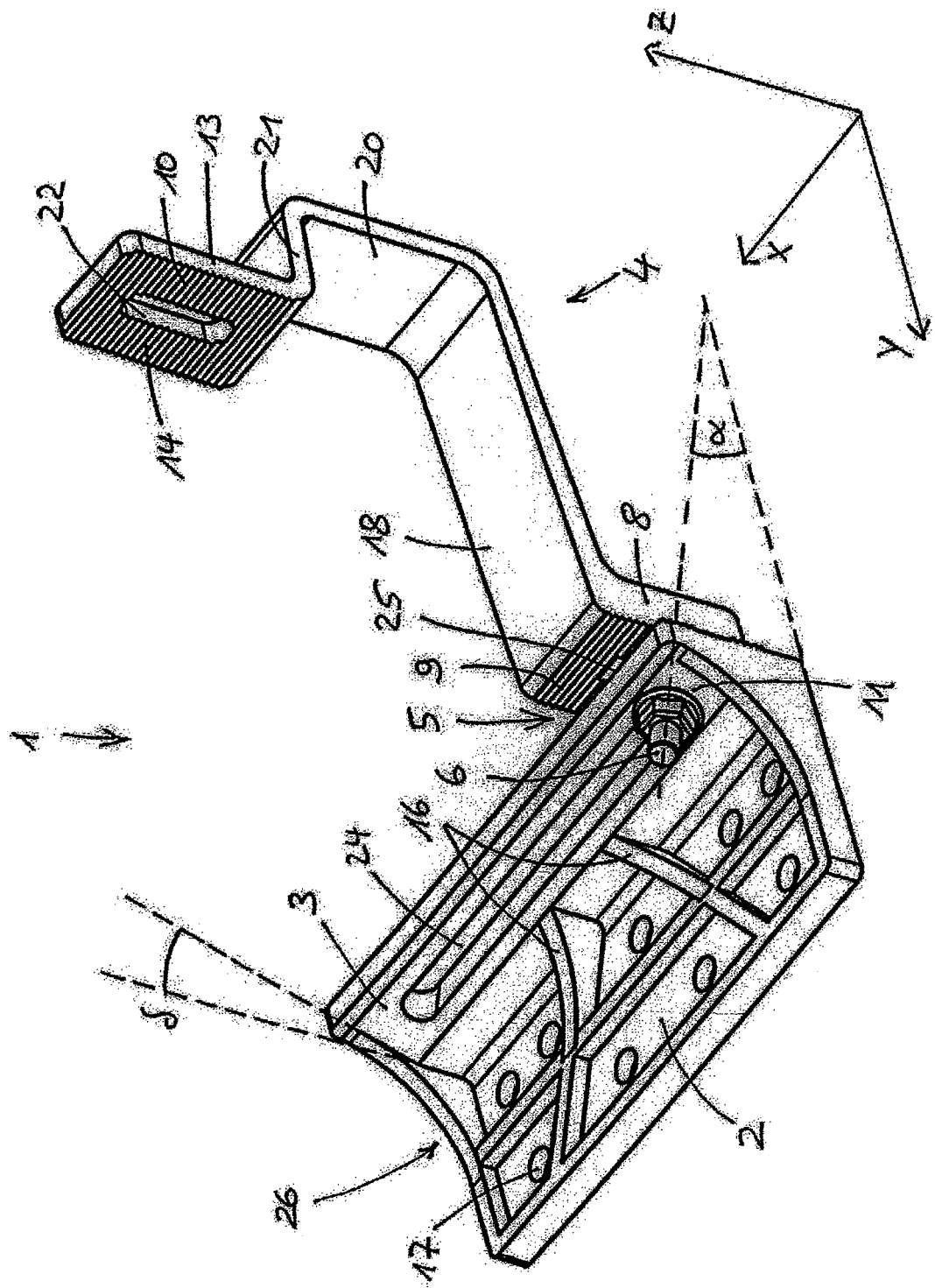
FIG. 2 shows a perspective view of the roof hook according to FIG. 1.

As illustrated in FIGS. 1 and 2, the fastening of the mount 4 to the fastening surface 7 of the second fastening section 3 takes place by means of a connecting element 6 which is made as a screw connection. Connecting element 6 extends from a stop surface 12 of the transition leg 8 that faces away from the fastening surface 9, through a slot 25 of the transition leg 8.

Slot 25 runs in the Z direction and through the slot 24 of the second fastening section 3, which runs in the X direction. Connecting element 6 can be fixed on a stop surface 12 of the second fastening section 3 facing away from the fastening surface 7. The screw connection 6 (connecting element 6) of the fasteners 5 which act obliquely to the Z direction extends at an angle $\alpha=20°$ to the first fastening section 2 in a screw space or area 26 which is defined by the first fastening section 2 and the second fastening section 3.

To increase the stability of the roof hook 1, in the exemplary embodiments according to FIGS. 1 and 2, reinforcing ribs 15 are provided along the side edge of the stop surface 12 of the transition leg 8. Ribs 15 extend in the Z direction along the transition leg 8 in the direction of the first fastening section 2 and in the Y direction from the plane of the fastening surface 7. The stop surface 12 thus forms a ramp between the laterally arranged reinforcing ribs 15. The stop surface 12 is tilted by an angle $\gamma$ relative to the fastening surface 9, which angle preferably corresponds to the angle $\alpha$. The stop surface 11 is titled by an angle $\delta$ relative to the fastening surface 7, which angle preferably corresponds to the angle $\alpha$ and/or the angle $\gamma$.

To further increase the stability of the roof hook 1, there are two reinforcing ribs 16 which run obliquely to the X and Y direction on the first fastening section 2 and which extend into the screw space 26. The stretching, i.e., expanding, of the reinforcing ribs 16 in the Z direction increases over their course in the direction of the transition leg. In other words, the reinforcing ribs 16 conform to the second fastening section 3 which extends in the Z direction as far as the slot 24. This yields a uniform distribution of the load acting on the roof hook 1 over the surface of the first fastening section 2.

As is apparent from the figures, all edges of the roof hook 1, except for the corner edges of the bottom of the rectangular first fastening section 2, are made rounded in order to reduce the risk of injury and to achieve corresponding optics.

The invention claimed is:

1. A mounting system for mounting of solar installation modules on roofs, said mounting system comprised of:
   a base unit having:
      a first fastening surface extending in an X and Y direction, the first fastening surface dimensioned to engage the roof for mounting the base unit to the roof; and
      a second fastening surface extending perpendicular to the first fastening surface in a Z direction wherein the second fastening surface of said base unit includes engagement elements that extend at least partially in the X direction;
   a hook-shaped mount for attaching to the solar installation module or a fastening profile for solar installation modules wherein the hook-shaped mount is attached to the second fastening surface of the base unit and is adjustable in the Z direction,
      wherein said hook-shaped mount has a transition leg that extends in a direction parallel to the second fastening surface, said transition leg including a fastening surface having engagement elements formed therein, said engagement elements of said transition leg extending at least partially in the X direction, wherein said engagement elements on said second fastening surface are dimensioned to matingly engage said engagement elements on said transition leg of said hook-shaped mount; and
   a connecting element that extends in a direction oblique to the Z direction for fixing the hook-shaped mount to the second fastening surface of the base unit;
   wherein the base unit includes a stop surface disposed on a side of the base unit that is opposite the second fastening surface and the transition leg of the hook-shaped mount includes a stop surface disposed on a side of the transition leg that is opposite the fastening surface of the transition leg, and wherein each of the stop surfaces is oriented oblique to the Z direction.

2. The mounting system as claimed in claim 1, wherein an elongated slot is formed in the second fastening surface of the base unit, the elongated slot extending in the X direction and the connecting element extending through the slot such that the hook-shaped mount can be adjusted in the X-direction.

3. The mounting system as claimed in claim 1, wherein at least one reinforcing rib is farmed in at least one of the stop surface of the base unit or the stop surface of the transition leg.

4. The mounting system as claimed in claim 2, wherein a longitudinal axis of the connecting element extends in a direction oblique to the Z direction at an angle $0<\alpha<60°$ to the first fastening surface, the connecting element extending through the base unit and into a space of the base unit that is disposed opposite the first fastening surface and the second fastening surface.

5. The mounting system as claimed in claim 1, wherein the hook-shaped mount includes a mounting leg disposed on an end thereof and wherein an elongated slot is formed in the mounting leg, the elongated slot extending in the Z direction and dimensioned for fixing a solar installation module or the fastening profile for solar installation modules to the hook-shaped mount.

6. The mounting system as claimed in claim 4, wherein the hook-shaped mount includes a mounting leg having one fastening surface facing the solar module or the fastening profile for the solar installation module and wherein the fastening surface of the mounting leg has engagement elements, which extend at least partially in the X direction.

7. The mounting system as claimed in claim 2, wherein a longitudinal axis of the connecting element extends in a direction oblique to the Z direction at an angle $10<\alpha<40°$ to the first fastening surface, the connecting element extending through the base unit and into a space of the base unit that is disposed opposite the first fastening surface and the second fastening surface.

8. The mounting system as claimed in claim 2, wherein a longitudinal axis of the connecting element extends in a direction oblique to the Z direction at an angle $15<\alpha<20°$ to the first fastening surface, the connecting element extending through the base unit and into a space of the base unit that is disposed opposite the first fastening surface and the second fastening surface.

9. The mounting system as claimed in claim 6, wherein the engagement elements are ribs that extend continuously from one end of the fastening surface of the mounting leg to an opposite end thereof.

* * * * *